(12) United States Patent
Sun et al.

(10) Patent No.: US 8,384,977 B2
(45) Date of Patent: Feb. 26, 2013

(54) LIGHT EXTRACTING DEVICE AND LIGHT EXTRACTING METHOD

(75) Inventors: Nai-Hsiang Sun, Kaohsiung (TW); Shih-Chiang Lin, Kaohsiung (TW); Jung-Sheng Chiang, Kaohsiung (TW); Wen-Fung Liu, Kaohsiung (TW); Gary A. Evans, Kaohsiung (TW); Jerome K. Butler, Kaohsiung (TW)

(73) Assignee: I Shou University, Kaohsiung (TW)

( * ) Notice: Subject to any disclaimer, the term of this patent is extended or adjusted under 35 U.S.C. 154(b) by 83 days.

(21) Appl. No.: 13/017,542

(22) Filed: Jan. 31, 2011

(65) Prior Publication Data

US 2012/0194892 A1    Aug. 2, 2012

(51) Int. Cl.
*G02F 1/01* (2006.01)
(52) U.S. Cl. .................................................... 359/238
(58) Field of Classification Search ............. 359/238, 359/237, 278, 279, 287, 566; 385/10, 37; 398/84, 87, 149
See application file for complete search history.

(56) References Cited

U.S. PATENT DOCUMENTS 6,195,162 B1* 2/2001 Varnham et al. ............. 356/478
6,441,938 B1* 8/2002 Heflinger et al. ............. 398/152

* cited by examiner

*Primary Examiner* — Tuyen Tra
(74) *Attorney, Agent, or Firm* — David Berquist; Jackson & Gowdey, LLP

(57) ABSTRACT

A light extracting device includes a dual light generating unit and a first order Bragg grating unit. The dual light generating unit is for receiving an input optical signal and a control signal, and for generating from the input optical signal first and second optical signals that have a phase difference there between. The phase difference is associated with the control signal. The first order Bragg grating unit is for receiving the first and second optical signals from the dual light generating unit, and for causing optical interference to occur between the first and second optical signals within a predetermined wavelength range to result in first and second output optical signals.

3 Claims, 4 Drawing Sheets

LIGHT EXTRACTING DEVICE AND LIGHT EXTRACTING METHOD

BACKGROUND OF THE INVENTION

1. Field of the Invention

The present invention relates to a device and method, more particularly to a light extracting device and light extracting method.

2. Description of the Related Art

Since a tremendous increase in transmission throughput required by internet and data communications applications has brought about expansion of scale of optical fiber networks, the demand for active and passive elements for optical fiber communications (such as optical switch) has increased significantly.

A conventional optical switch based on micro-opto-electromechanical system (MOEMS) is disclosed in Taiwanese Utility Model Patent No. 516641 and uses a plurality of rotatable micro double-faced mirrors (not shown) to achieve an effect of light switching. For example, the micro double-faced mirrors are mounted on rotation-controllable motors (not shown), and by varying orientation of the micro double-faced mirrors mutually, path directions of optical signals are changed for rapid switching of the optical signals to form a plurality of optical switches. Furthermore, the micro double-faced mirrors change the path directions of the optical signals by rotating about pivot axes of the micro double-faced mirrors, and a plurality of sets of optical signals are switched when the micro double-faced mirrors rotate mutually, such that the conventional optical switch is capable of multiple input and output.

However, the conventional optical switch is relatively complicated to design because of its use of the micro double-faced mirrors.

SUMMARY OF THE INVENTION

Therefore, an object of the present invention is to provide a light extracting device capable of reducing complexity in design.

Accordingly, the light extracting device of this invention comprises a dual light generating unit and a first order Bragg grating unit.

The dual light generating unit is for receiving an input optical signal and a control signal, and for generating from the input optical signal first and second optical signals that have a phase difference there between. The phase difference is associated with the control signal.

The first order Bragg grating unit is for receiving the first and second optical signals from the dual light generating unit, and for causing optical interference to occur between the first and second optical signals within a predetermined wavelength range to result in first and second output optical signals.

A second object of the present invention is to provide a light extracting method.

Accordingly, the light extracting method of this invention is to be implemented using a light extracting device that includes a dual light generating unit and a first order Bragg grating unit. The dual light generating unit is configured for receiving an input optical signal and a control signal, and for generating from the input optical signal first and second optical signals that have a phase difference there between. The phase difference is associated with the control signal. The first order Bragg grating unit is configured for receiving the first and second optical signals from the dual light generating unit, and for causing optical interference to occur between the first and second optical signals within a predetermined wavelength range to result in first and second output optical signals.

The light extracting method comprises:

providing the input optical signal to the dual light generating unit, the input optical signal being substantially coherent, and having a wavelength falling within the predetermined wavelength range; and providing the control signal to the dual light generating unit, the control signal having a state for causing power of the first output optical signal from the first order Bragg grating unit to reach a predetermined first level, and for causing power of the second output optical signal from the first order Bragg grating unit to reach a predetermined second level.

A third object of the present invention is to provide another light extracting method.

Accordingly, the light extracting method of this invention is to be implemented using a light extracting device that includes a dual light generating unit and a first order Bragg grating unit. The dual light generating unit is configured for receiving an input optical signal and a control signal, and for generating from the input optical signal first and second optical signals that have a phase difference there between. The phase difference is associated with the control signal. The first order Bragg grating unit is configured for receiving the first and second optical signals from the dual light generating unit, and for causing optical interference to occur between the first and second optical signals within a predetermined wavelength range to result in first and second output optical signals.

The light extracting method comprises:

providing the input optical signal to the dual light generating unit, the input optical signal being substantially coherent, and having a wavelength falling within the predetermined wavelength range;

providing the control signal to the dual light generating unit, the control signal having a first state for causing power of the first output optical signal from the first order Bragg grating unit to reach a substantially maximum level, and for causing power of the second output optical signal from the first order Bragg grating unit to reach a substantially minimum level; and adjusting the control signal from the first state to a second state for causing the power of the first output optical signal from the first order Bragg grating unit to reach the substantially minimum level, and for causing the power of the second output optical signal from the first order Bragg grating unit to reach the substantially maximum level.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
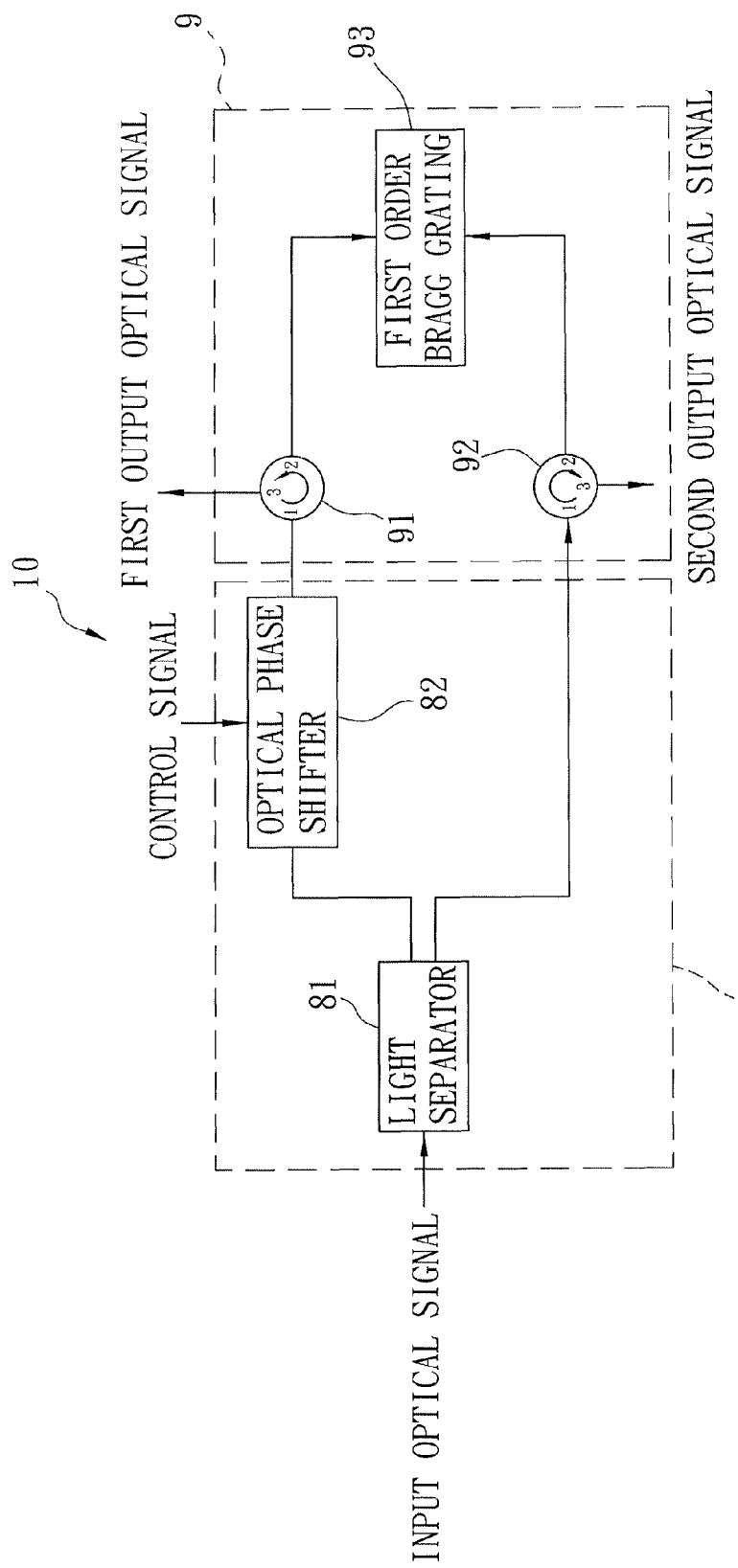
FIG. 1 is a block diagram of a preferred embodiment of a light extracting device of the present invention.

Referring to FIG. 1, a preferred embodiment of a light extracting device 10 according to the present invention includes a dual light generating unit 8 and a first order Bragg grating unit 9.

The dual light generating unit 8 is for receiving an input optical signal and a control signal, and for generating from the input optical signal first and second optical signals that have a phase difference there between. The phase difference is associated with the control signal.

The first order Bragg grating unit 9 is for receiving the first and second optical signals from the dual light generating unit 8, and for causing optical interference to occur between the first and second optical signals within a predetermined wavelength range to result in first and second output optical signals.

In this embodiment, the dual light generating unit 8 includes a light separator 81 and an optical phase shifter 82.

The light separator 81 has a separator input end and first and second separator output ends. The light separator 81 is adapted for receiving the input optical signal at the separator input end, separating the input optical signal into two optical signals having substantially equal power, and outputting the two optical signals at the first and second separator output ends, respectively. In this embodiment, the light separator 81 is a −3 dB coupler.

The optical phase shifter 82 has a shifter input end coupled to the first separator output end, a shifter output end, and a control end. The optical phase shifter 82 is adapted for receiving the control signal at the control end, and adjusts phase of one of the two optical signals received at the shifter input end to result in the first optical signal that is outputted at the shifter output end. In this embodiment, the optical phase shifter 82 is a fiber phase shifter, and the control signal is a voltage signal.

In this embodiment, the first order Bragg grating unit 9 includes a first light circulator 91, a second light circulator 92, and a first order Bragg grating 93.

The first light circulator 91 has a first end coupled to the shifter output end of the optical phase shifter 82 to receive the first optical signal therefrom, a second end for outputting the first optical signal, and a third end.

The second light circulator 92 has a first end coupled to the second separator output end of the light separator 81 to receive the second optical signal (i.e., another one of the two optical signals) therefrom, a second end for outputting the second optical signal, and a third end. Each of the first and second light circulators 91, 92 will output optical signals, which are received at the first ends of the first and second light circulators 91, 92, at the second ends thereof, and output optical signals, which are received at the second ends of the first and second light circulators 91, 92, at the third ends thereof, respectively.

The first order Bragg grating 93 has a first end coupled to the second end of the first light circulator 91, and a second end coupled to the second end of the second light circulator 92. In this embodiment, the first order Bragg grating 93 is a first order fiber Bragg grating (FBG) that is formed in a fiber core of an optical fiber and that is extensively applied in many device components in the field of optical communications. The first order Bragg grating 93 has a physical characteristic that an input light will result in a reflected light and a transmitted light because of resonance coupling when a wavelength of the input light satisfies the first order Bragg condition:

$\Lambda = \pi/\beta$, wherein $\Lambda$ represents a grating period, and $\beta$ represents a propagation constant. Therefore, when the first order Bragg condition is satisfied, and both ends of the first order Bragg grating 93 are fed with input lights, optical interference occurs between the input light propagating from the first end toward the second end and the input light propagating from the second end toward the first end. The predetermined wavelength range is determined according to the first order Bragg condition. The first order Bragg grating 93 receives the first and second optical signals from the second ends of the first and second light circulators 91, 92 and provides the first and second output optical signals to the second ends of the first and second light circulators 91, 92 such that the first and second light circulators 91, 92 output the first and second output optical signals at the third ends thereof, respectively.

Figure 2:
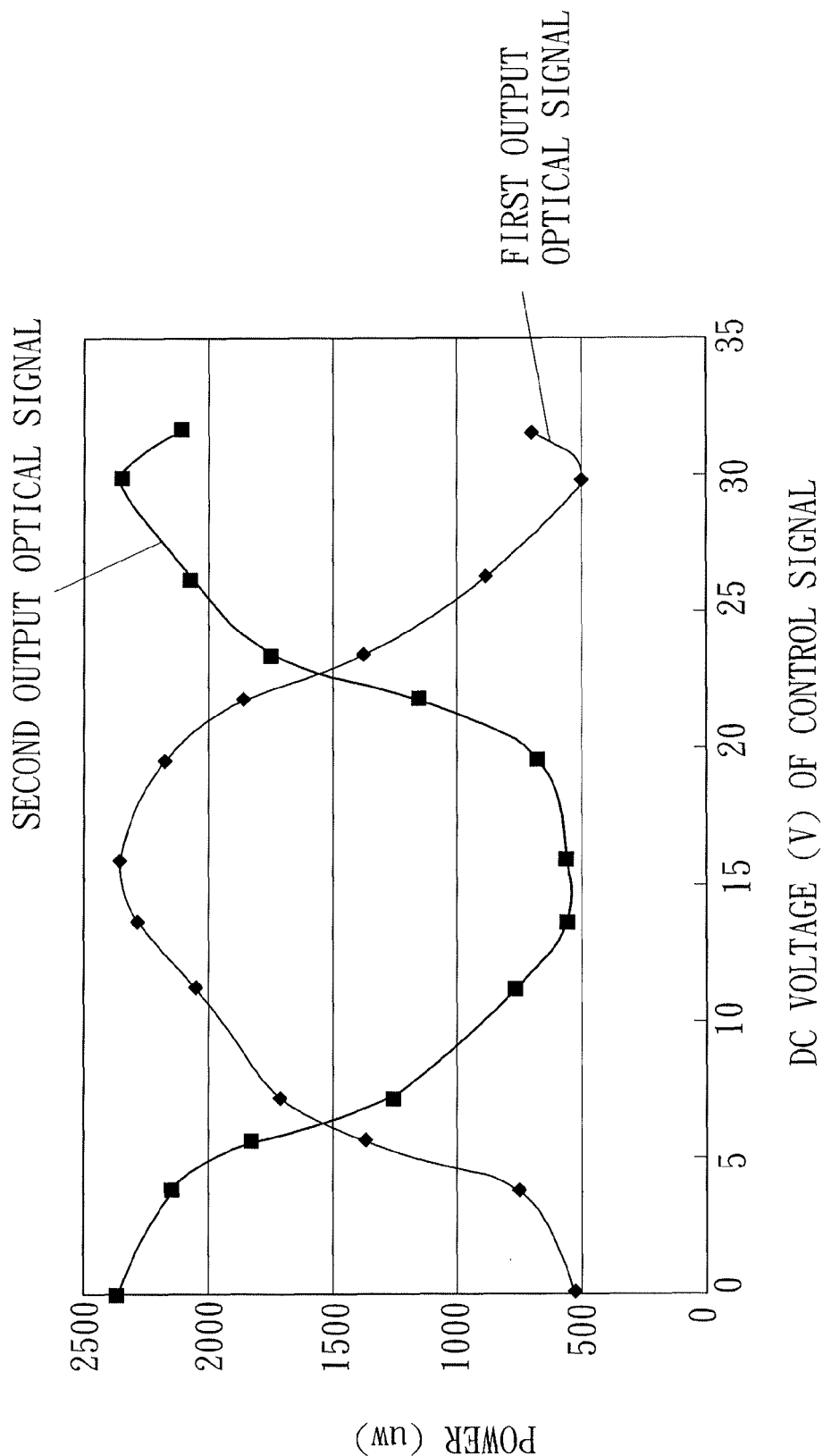
FIG. 2 is a plot of experimental results of the preferred embodiment.

Referring to FIG. 1 and FIG. 2, under the condition that the resonant wavelength of the first order Bragg grating 93 is 1545.39 nm, and that the input optical signal is coherent, and has a wavelength equal to 1545.48 nm and power with a value of 6 dBm (about 3.891 mW), powers of the first and second output optical signals vary as power of the control signal varies. When the control signal has a voltage value equal to 0V, the power of the first output optical signal has a value equal to 0.52675 mW (i.e., a minimum level), and the power of the second output optical signal has a value equal to 2.35802 mW (i.e., a maximum level). This illustrates that a majority of optical signals is outputted at the third end of the second circulator 84. When the voltage of the control signal is increasing, the power of the first output optical signal increases gradually, and the power of the second output optical signal decreases gradually. When the voltage value of the control signal is 15.9V, the power value of the first output optical signal is 2.33744 mW (i.e., a maximum level), and the power value of the second output optical signal is 0.55967 mW (i.e., a minimum level). This illustrates that a majority of the optical signals is outputted at the third end of the first circulator 83, and an energy exchanging voltage (i.e., the voltage of the control signal) is a direct current voltage of about 16V.

Figure 3:
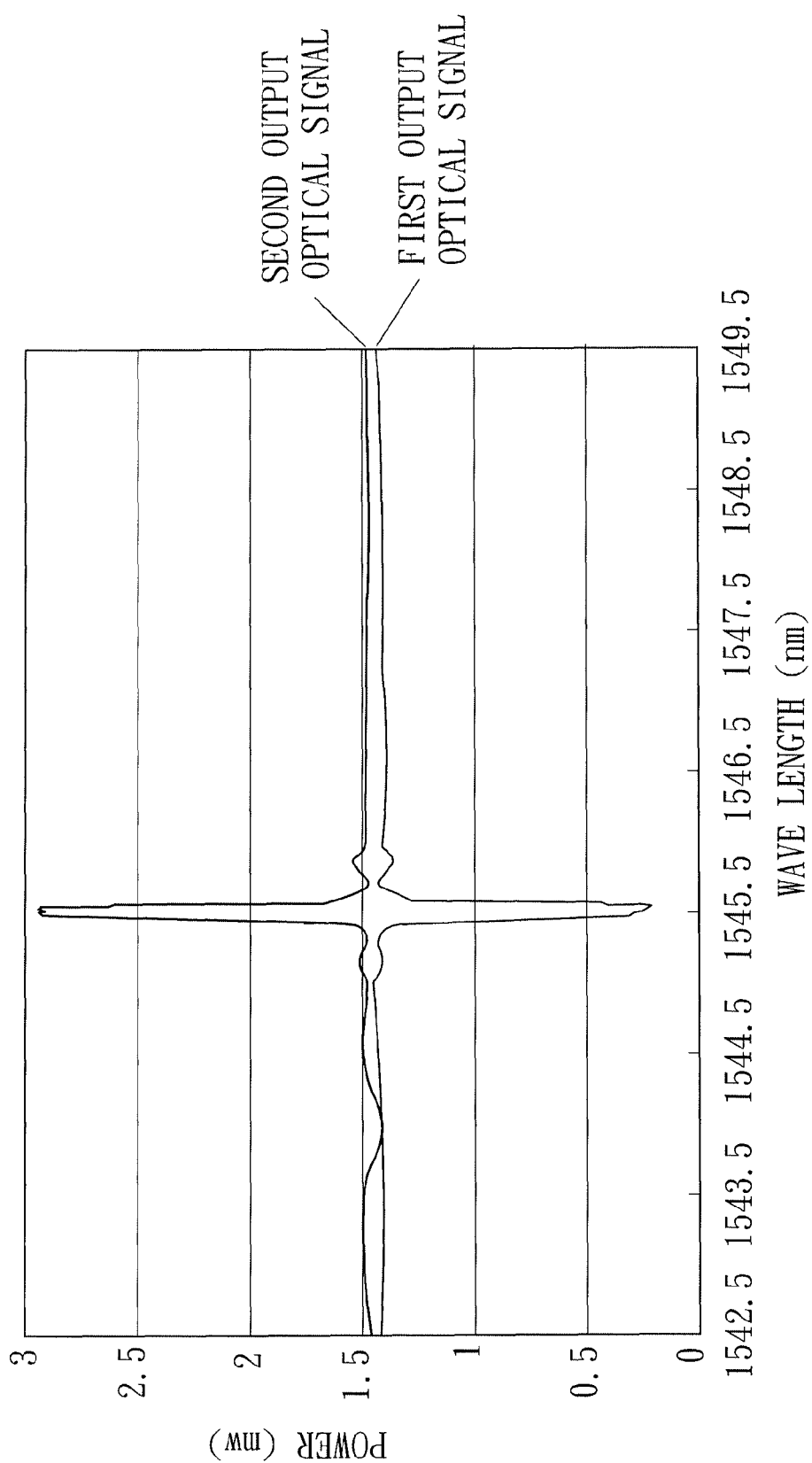
FIG. 3 is another plot of experimental results of the preferred embodiment.

Referring to FIG. 1 and FIG. 3, under the condition that a resonant range of the first order Bragg grating 93 ranges from 1545.44 nm to 1545.6 nm, that the input optical signal is coherent and has power with a value of 6 dBm (about 3.891 mW), and that the voltage of the control signal is 0V, the powers of the first and second output optical signals vary as the wavelength of the input optical signal varies. In the resonant range, the power of the second output optical signal has a maximum level at 2.95 mW because of strongest constructive interference, and the power of the first output optical signal has a minimum level at 0.23 mW because of strongest destructive interference. This illustrates that powers of the first and second output optical signals will be concentrated on one of the first and second output optical signals when the input optical signal has a strongest interference wavelength.

Figure 4:
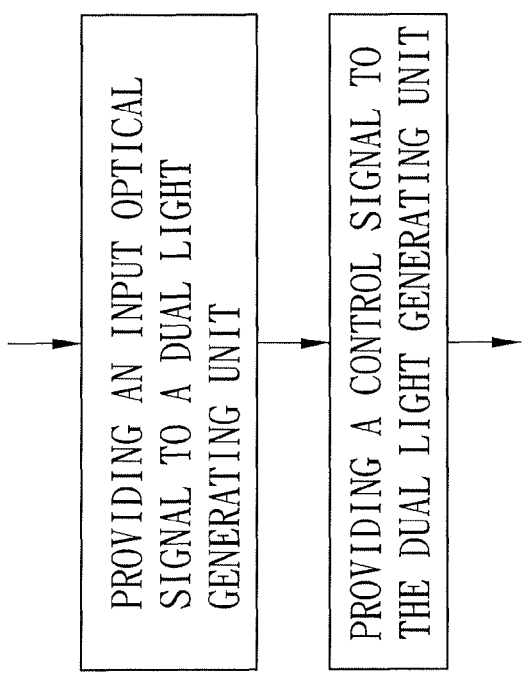
FIG. 4 is a flowchart of a first preferred embodiment of a light extracting method of the present invention.

Referring to FIG. 1 and FIG. 4, a first preferred embodiment, which is configured to be applied in optical modulation, of a light extracting method of the present invention is illustrated. The light extracting method is to be implemented using a light extracting device 10 that includes a dual light generating unit 8 and a first order Bragg grating unit 9. The dual light generating unit 8 is configured for receiving an input optical signal and a control signal, and for generating from the input optical signal first and second optical signals that have a phase difference there between. The phase difference is associated with the control signal. The first order Bragg grating unit 9 is configured for receiving the first and second optical signals from the dual light generating unit 8, and for causing optical interference to occur between the first and second optical signals within a predetermined wavelength range to result in first and second output optical signals.

The light extracting method of this embodiment comprises:

providing the input optical signal to the dual light generating unit 8, the input optical signal being substantially coherent, and having a wavelength falling within the predetermined wavelength range; and providing the control signal to the dual light generating unit 8, the control signal having a state for causing power of the first output optical signal from the first order Bragg grating unit 9 to reach a predetermined first level, and for causing power of the second output optical signal from the first order Bragg grating unit 9 to reach a predetermined second level. For example, referring to FIG. 2, when the control signal has a voltage equal to 11.2V, the powers of the first and second output optical signals have values of 2.04115 mW and 0.76543 mW, respectively.

Figure 5:
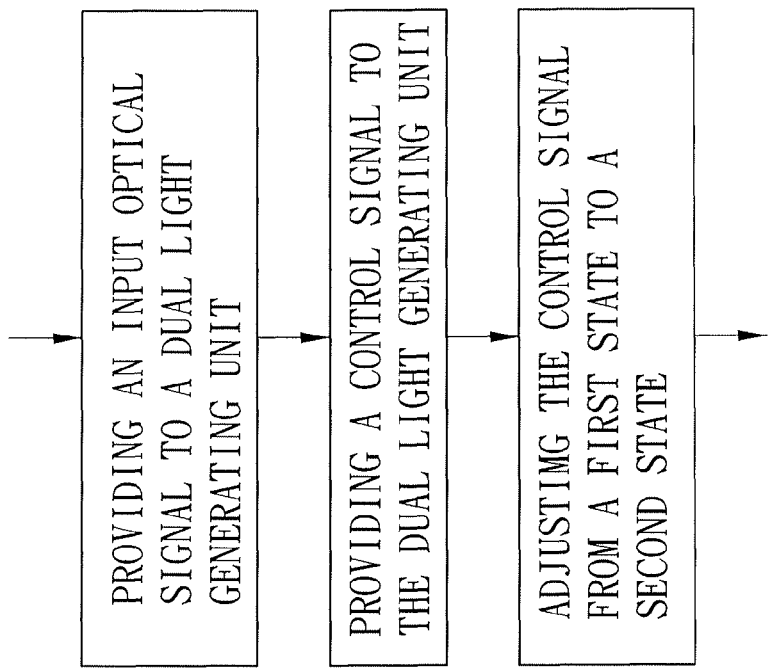
FIG. 5 is a flowchart of a second preferred embodiment of the light extracting method of the present invention.

Referring to FIG. 1 and FIG. 5, a second preferred embodiment, which is configured to be applied in an optical switch, of a light extracting method of the present invention is illustrated. The light extracting method is to be implemented using a light extracting device 10 that includes a dual light generating unit 8 and a first order Bragg grating unit 9. The dual light generating unit 8 is configured for receiving an input optical signal and a control signal, and for generating from the input optical signal first and second optical signals that have a phase difference there between. The phase difference is associated with the control signal. The first order Bragg grating unit 9 is configured for receiving the first and second optical signals from the dual light generating unit 8, and for causing optical interference to occur between the first and second optical signals within a predetermined wavelength range to result in first and second output optical signals.

The light extracting method of this embodiment comprises:

providing the input optical signal to the dual light generating unit 8, the input optical signal being substantially coherent, and having a wavelength falling within the predetermined wavelength range;

providing the control signal to the dual light generating unit 8, the control signal having a first state for causing power of the first output optical signal from the first order Bragg grating unit 9 to reach a substantially maximum level, and for causing power of the second output optical signal from the first order Bragg grating unit 9 to reach a substantially minimum level; and adjusting the control signal from the first state to a second state for causing the power of the first output optical signal from the first order Bragg grating unit 9 to reach the substantially minimum level, and for causing the power of the second output optical signal from the first order Bragg grating unit 9 to reach the substantially maximum level.

For example, referring to FIG. 2, when the control signal has a voltage equal to 15.9V, the powers of the first and second output optical signals have values of 2.3374 mW and 0.55967 mW, respectively. When the voltage of the control signal is 0V, the powers of the first and second output optical signals have values of 0.52675 mW and 2.35802 mW, respectively.

In summary, when the preferred embodiment of the present invention is applied in the optical switch, only a phase of the first optical signal received by the first order Bragg grating unit 9 needs to be controlled for changing a result of optical interference, such that the powers of the first and second output optical signals will be concentrated on one of the first and second output optical signals so as to form the optical switch. Compared with a conventional optical switch, the preferred embodiment of the present invention is capable of reducing complexity in design. Moreover, the present invention may be applied in an optical modulator.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light extracting device comprising:

a dual light generating unit for receiving an input optical signal and a control signal, and for generating from the input optical signal first and second optical signals that have a phase difference there between, the phase difference being associated with the control signal, said dual light generating unit including a light separator having a separator input end and first and second separator output ends, said light separator being adapted for receiving the input optical signal at said separator input end, separating the input optical signal into two optical signals having substantially equal power, and outputting the two optical signals at said first and second separator output ends, respectively, and an optical phase shifter having a shifter input end coupled to said first separator output end, a shifter output end, and a control end, said optical phase shifter being adapted for receiving the control signal at said control end, and adjusting phase of one of the two optical signals received at said shifter input end to result in the first optical signal that is outputted at said shifter output end; and a first order Bragg grating unit for receiving the first and second optical signals from said dual light generating unit, and for causing optical interference to occur between the first and second optical signals within a predetermined wavelength range to result in first and second output optical signals, said first order Bragg grating unit including a first light circulator having a first end coupled to said shifter output end to receive the first optical signal therefrom, a second end for outputting the first optical signal, and a third end a second light circulator having a first end coupled to said second separator output end of said light separator to receive the second optical signal therefrom, a second end for outputting the second optical signal, and a third end, and a first order Bragg grating having a first end coupled to said second end of said first light circulator, and a second end coupled to said second end of said second light circulator, said first order Bragg grating receiving the first and second optical signals from said second ends of said first and second light circulators and providing the first and second output optical signals to said second ends of said first and second light circulators such that said first and second light circulators output the first and second output optical signals at said third ends thereof, respectively.

2. The light extracting device as claimed in claim 1, wherein said light separator is a −3 dB coupler.

3. A light extracting method to be implemented using a light extracting device that includes a dual light generating unit and a first order Bragg grating unit, the dual light generating unit being configured for receiving an input optical signal and a control signal, and for generating from the input optical signal first and second optical signals that have a phase difference therebetween, the phase difference being associated with the control signal, the first order Bragg grating unit being configured for receiving the first and second optical signals from the dual light generating unit, and for causing optical interference to occur between the first and second optical signals within a predetermined wavelength range to result in first and second output optical signals, the light extracting method comprising:

providing the input optical signal to the dual light generating unit, the input optical signal being substantially coherent, and having a wavelength falling within the predetermined wavelength range;

providing the control signal to the dual light generating unit, the control signal having a first state for causing power of the first output optical signal from the first order Bragg grating unit to reach a substantially maximum level, and for causing power of the second output optical signal from the first order Bragg grating unit to reach a substantially minimum level; and adjusting the control signal from the first state to a second state for causing the power of the first output optical signal from the first order Bragg grating unit to reach the substantially minimum level, and for causing the power of the second output optical signal from the first order Bragg grating unit to reach the substantially maximum level.

\* \* \* \* \*